United States Patent [19]

Matlack

[11] Patent Number: 5,518,158

[45] Date of Patent: May 21, 1996

[54] PICKUP TRUCK TAILGATE TOOLBOX ASSEMBLY

[76] Inventor: William L. Matlack, Rte. 1, Box 186, Burrton, Kans. 67020

[21] Appl. No.: 320,919

[22] Filed: Oct. 11, 1994

[51] Int. Cl.$^6$ .............................. B60R 9/055; B60R 9/06
[52] U.S. Cl. ............................ 224/402.000; 224/404; 224/403; 224/488; 296/37.1; 296/37.6; 296/51
[58] Field of Search ...................... 224/402, 403, 224/404, 488, 496, 497, 502, 504, 505, 309, 311, 328; 296/50, 51, 37.1, 37.6, 37.13

[56] References Cited

U.S. PATENT DOCUMENTS

| | | | |
|---|---|---|---|
| 3,471,070 | 10/1969 | Olson | 224/402 |
| 3,473,680 | 10/1969 | Downer | 224/311 |
| 4,266,821 | 5/1981 | Gillet | 296/37.6 |
| 4,416,483 | 11/1983 | Koch | 224/309 |
| 4,451,075 | 5/1984 | Canfield | 296/37.6 |
| 4,531,773 | 7/1985 | Smith | 224/403 |
| 4,570,986 | 2/1986 | Sams | 293/117 |
| 4,674,782 | 6/1987 | Helber | 293/106 |
| 4,696,507 | 9/1987 | Alldredge | 296/37.6 |
| 4,749,226 | 6/1988 | Heft | 296/37.6 |
| 4,760,621 | 8/1988 | Stromquist | 220/335 |
| 4,828,312 | 5/1989 | Kinkel et al. | 224/404 |
| 4,893,856 | 1/1990 | Council | 293/106 |
| 4,915,437 | 4/1990 | Cherry | 296/37.6 |
| 4,938,398 | 7/1990 | Hallsen | 224/42.42 |
| 4,938,519 | 7/1990 | Schlachter | 296/37.6 |
| 4,993,610 | 2/1991 | Abretske et al. | 296/37.6 |
| 5,080,250 | 1/1992 | Dickinson et al. | 220/335 |
| 5,083,829 | 1/1992 | Fonseca | 296/37.6 |
| 5,121,306 | 6/1992 | Palmisano | 296/37.6 |
| 5,215,346 | 6/1993 | Reitzloff et al. | 296/37.6 |
| 5,232,259 | 8/1993 | Booker | 296/37.6 |

FOREIGN PATENT DOCUMENTS

| | | | |
|---|---|---|---|
| 3339416 | 8/1985 | Germany | 293/37.1 |

*Primary Examiner*—Henry J. Recla
*Assistant Examiner*—Charles R. Eloshway
*Attorney, Agent, or Firm*—John R. Flanagan

[57] ABSTRACT

A tailgate toolbox assembly for a pickup truck includes a toolbox having an attachment member mounted on an inner side of the pickup tailgate and a tool storage compartment pivotally hinged to the attachment member. The attachment member and tool storage compartment both extend substantially the length of the tailgate. The toolbox also has supports extending between the tool storage compartment and the attachment member at each end of the tailgate. The tailgate toolbox assembly further includes a rigid cover, such as a tread plate, for the toolbox. The tread cover plate is shaped to protect the toolbox and to permit mobile equipment to be loaded and unloaded thereover onto the pickup bed. The toolbox assembly being attached to the tailgate and in a closed position can be moved downward until horizontal and the tool storage compartment can then be pivoted upward until vertical to reveal tools stored therein. In the horizontal open usage position the attachment member being in the form of a flat sheet provides a workbench with the tools being readily accessible thereabove.

20 Claims, 2 Drawing Sheets

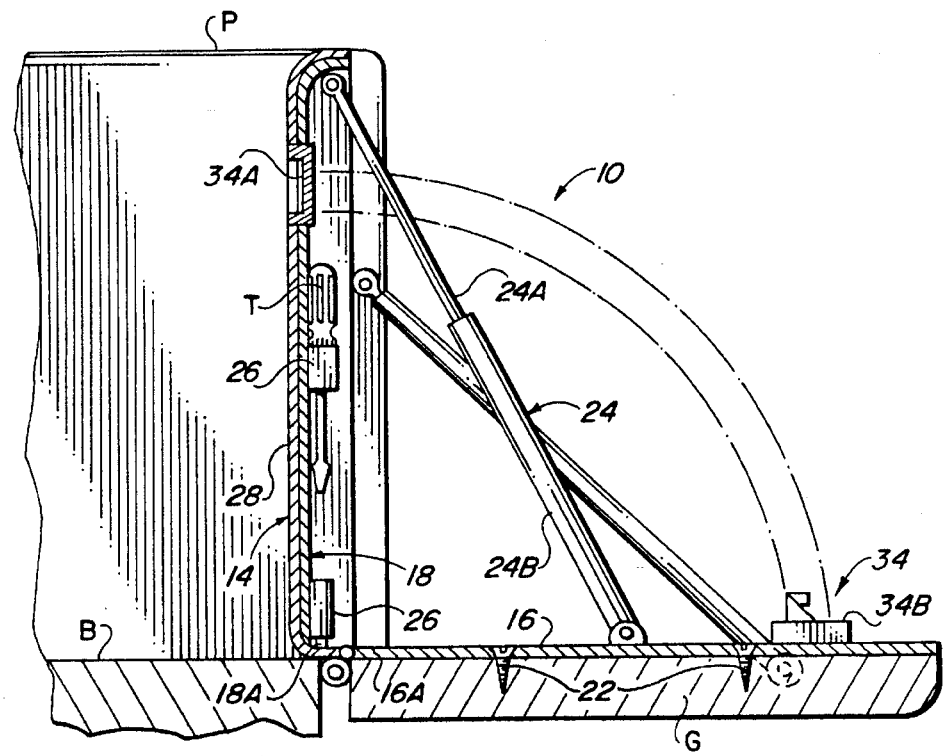
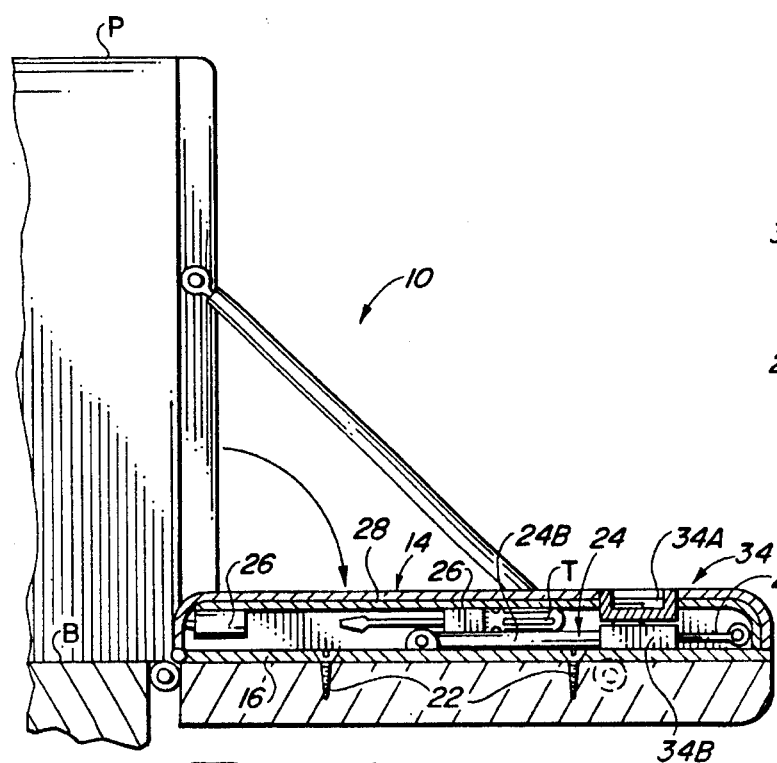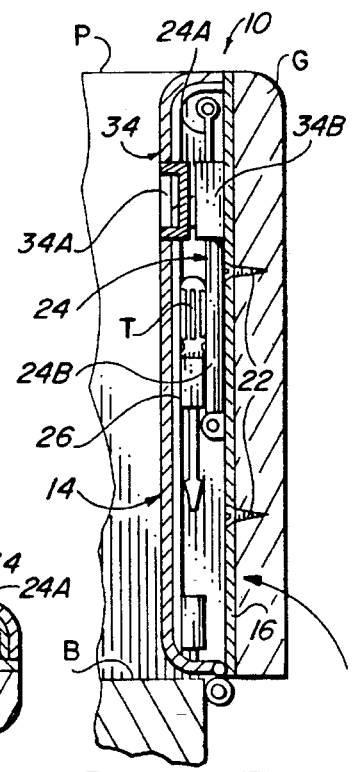

PICKUP TRUCK TAILGATE TOOLBOX ASSEMBLY

BACKGROUND OF THE INVENTION

1. Field of the Invention

The present invention generally relates to toolboxes for vehicles and, more particularly, is concerned with a pickup truck tailgate toolbox assembly.

2. Description of the Prior Art

Pickup trucks are often owned and used by those who have a need to carry tools with them in their vehicle. However, due to the limited space in the cabs of most pickups, tools must be kept at another part of the vehicle. Many pickup users have toolboxes attached or unattached to the bed of their trucks. A variety of compartments have also been designed to provide for the safekeeping and storage of tools outside the cabs of these vehicles.

Many such compartments are boxes, covers or other kinds of enclosures located in the bed of pickup trucks, representative examples of which are disclosed in U.S. Pat. No. 4,451,075 to Canfield, U.S. Pat. No. 4,749,226 to Heft, U.S. Pat No. 4,938,398 to Hallsen, U.S. Pat. No. 4,938,519 to Schlachter and U.S. Pat. No. 5,083,829 to Fonseca. While some of the here mentioned prior art may use the tailgate of pickups as part of the enclosure for the storage compartment, none of these compartments are built into the tailgate itself and all of them make it difficult to load or unload items onto or from the bed of the truck.

Other common locations for the storage of tools are bumpers, running boards and the underside of pickup beds. Representative examples are disclosed in U.S. Pat. No. 4,570,986 to Sams, U.S. Pat. No. 4,674,782 to Helber, U.S. Pat. No. 4,696,507 to Alldredge, U.S. Pat. No. 4,893,856 to Council and U.S. Pat. No. 4,915,437 to Cherry. While much of the here mentioned prior art do have hidden toolboxes, none have an easily accessible, unencumbered, vertical display of tools and none involve tailgates, except for U.S. Pat. No. 4,266,821 to Gillet, which does disclose a combined tailgate and toolbox structure.

The Gillet patent discloses a toolbox with walls on all sides dimensioned to fit within a pickup bed, which has confronting stanchions having top-center suspension pivots supporting the toolbox solely on the tailgate so that the toolbox swings from a closed-storage position within the pickup bed when the tailgate is closed to an open-access position extending beyond the bed when the tailgate is open. However, the Gillet toolbox is not hidden, does not have an easily accessible, unencumbered, vertical display of tools and makes it difficult to load or unload items onto or from the pickup bed.

Consequently, a need still exists for a toolbox with easy access, yet one that is hidden and still permits the user to take full advantage of the wide variety of uses of a pickup truck.

SUMMARY OF THE INVENTION

The present invention provides a pickup truck tailgate toolbox assembly designed to satisfy the aforementioned needs by avoiding the drawbacks of the prior art without introducing new disadvantages. The principal advantage of the present invention is that the assembly requires little space and permits the user of a pickup truck to continue to take full advantage of the wide variety of uses of the truck.

Accordingly, the present invention is directed to a toolbox storage assembly for a pickup tailgate. The assembly comprises: (a) a toolbox mountable on an inner side of a pickup tailgate; and (b) a rigid cover overlying and protecting the toolbox and being shaped to permit mobile equipment to be loaded and unloaded thereover onto a pickup bed. The rigid cover preferably, although not necessarily, is a tread plate having a pattern of tread segments defined thereon to provide a gripping surface for tires of mobile equipment.

The toolbox includes an attachment member mountable on the inner side of the pickup tailgate so as to extend substantially the length of the tailgate and a tool storage compartment extending substantially the length of the attachment member and being mounted thereto so as to undergo movement between closed and open usage positions relative thereto and to the tailgate. More particularly, the attachment member and tool storage compartment are pivotally hinged to one another along first adjacent longitudinal edges thereof.

Also, the toolbox includes at least one support and preferably a plurality of supports extending between the tool storage compartment and attachment member. The supports are in the form of a pair of actuators extending between the attachment and tool storage compartment at each of a pair of opposite ends thereof. Each actuator is movable between extended and retracted conditions for controlling movement of the tool storage compartment and attachment member between the open usage and closed positions.

The toolbox assembly when attached to the tailgate and disposed in a closed position can be moved down with the tailgate until horizontal and then the tool storage compartment may be pivoted upward until vertical to place the toolbox in the open usage position and reveal the tools stored therein. In the open usage position of the toolbox, the attachment member which takes the form of a flat sheet is disposed in the horizontal position providing a workbench with the tools readily accessible.

The present invention is also directed to a pickup tailgate toolbox storage assembly which comprises: (a) an elongated movably mountable pickup tailgate; and (b) the above-defined elongated toolbox mounted in a flush relationship on an inner side of the pickup tailgate and extending substantially the length of the pickup tailgate, the toolbox being moved with movement of the pickup tailgate.

Finally, the present invention is further directed to a protective cover for a tailgate toolbox which comprises: (a) a rigid plate extending the length of a toolbox and being concave shaped in cross-section to protect the toolbox and to permit mobile equipment to be loaded and unloaded thereover onto the pickup bed; and (b) a pattern of tread segments formed on the rigid plate to provide a gripping surface for the wheels of mobile equipment.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is an enlarged side elevational view of the open usage position of the tailgate toolbox assembly taken along 3—3 of FIG. 1.

FIG. 4 is an enlarged side elevational view of the horizontal closed position of the tailgate toolbox assembly taken along 4—4 of FIG. 2.

FIG. 5 is an enlarged side elevational view of the vertical closed position of the tailgate toolbox assembly.

DETAILED DESCRIPTION OF THE INVENTION

Figure 1:
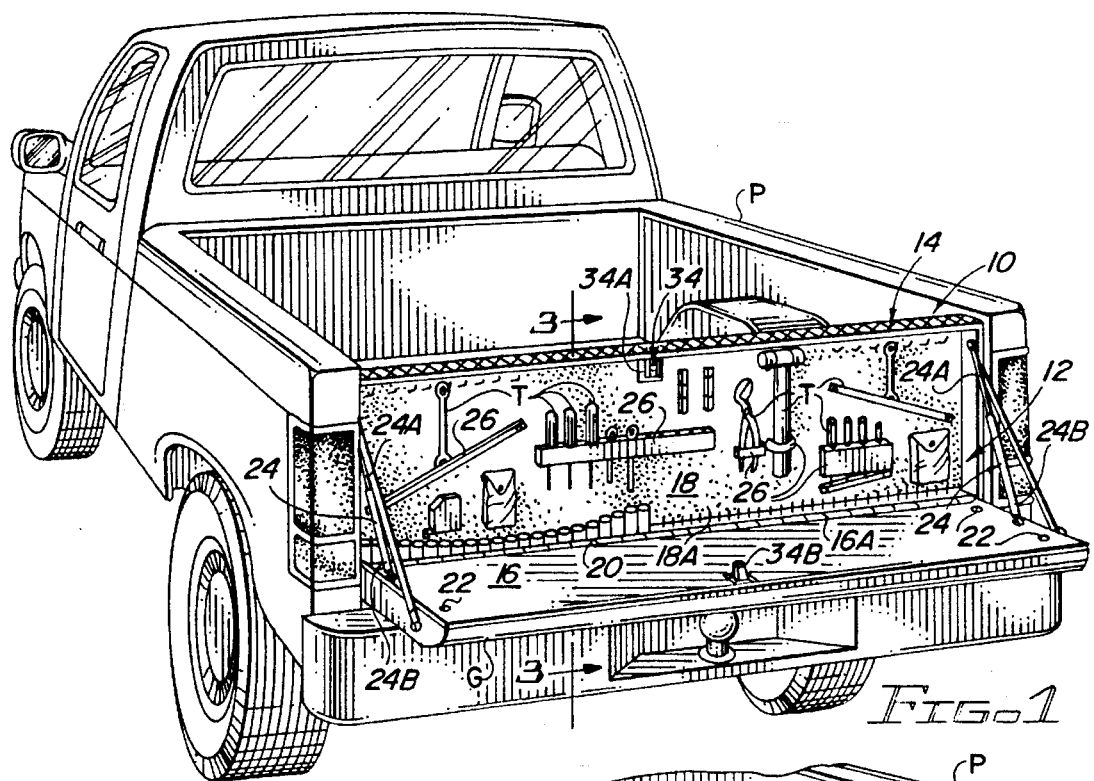
FIG. 1 is a perspective view of the open usage position of the tailgate toolbox assembly of the present invention mounted on the rear end of a pickup truck bed.
Figure 2:
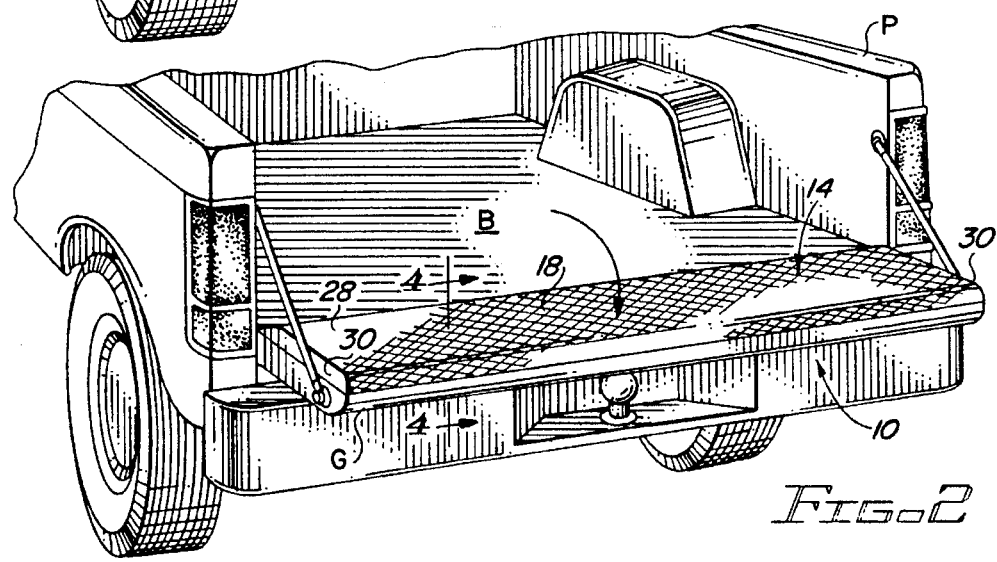
FIG. 2 is a perspective view of the horizontal closed position of the tailgate toolbox assembly.

Referring to the drawings and particularly to FIGS. 1 and 2, there is illustrated a tailgate toolbox assembly of the present invention, being generally designated 10, mounted to a tailgate G pivotally mounted at the rear end of the bed B of a pickup truck P. Basically, the tailgate toolbox assembly 10 includes the tailgate G, a toolbox 12, and a rigid cover 14 overlying and protecting the toolbox 12 with both the toolbox 12 and cover 14 mounted to the inner side of the tailgate G.

The toolbox 12 of the assembly 10 includes an attachment member 16 in the form of a flat rectangular plate or sheet 16 and a tool storage compartment 18 pivotally hinged at 20 to one another along adjacent first or inner longitudinal edges 16A, 18A thereof for movement between open usage and closed positions, as respectively shown in FIGS. 1 and 3 and FIGS. 2 and 4. As seen in FIGS. 1 and 3, the flat sheet 16 is secured to and mounted in a flush relationship by any suitable fastening devices 22, such as screws or bolts, on an inner side of a tailgate G of the pickup P. The flat sheet 16 extends substantially the length and width of tailgate G so as to substantially overlie and cover the inner side of the tailgate. The tool storage compartment 18 also extends substantially the length and width of the flat sheet 16 so as to substantially overlie and cover the flat sheet. Also, the flat sheet 16 and/or tool storage compartment 18 preferably have weather stripping (not shown) about the peripheries thereof to provide a sealant to prevent moisture and other external substances from entering and collecting inside of the toolbox 12.

Referring to FIGS. 3 and 4, the toolbox 12 also includes at least one and preferably a pair of supports 24 connected to and extending between the flat sheet 16 and the tool storage compartment 18 at the respective opposite lateral ends thereof and of the tailgate G. Preferably, each support 24 is an actuator 24 having a pair of inner and outer telescoping members 24A, 24B movable between an extended condition, as shown in FIG. 3 and a retracted condition, as shown in FIG. 4, for controlling movement of assembly 10 between the open usage position, as shown in FIG. 1 and 3 and the closed position, as shown in FIGS. 2 and 4. Each actuator 24 preferably is of the type which contains a pressurized gas which biases the inner and outer telescoping members 24A, 24B toward the extended condition of FIG. 3 so as to thereby maintain the assembly 10 in the open usage position wherein the tool storage compartment 18 pivoted away from the flat sheet 16.

As seen in FIG. 1, a variety of tools T can be stored in the toolbox 12. The tool storage compartment 18 has a plurality of different tool receiving and restraining structures 26 attached thereon to support and store the tools T and to prevent the tools T from becoming dislodged therefrom during normal use of pickup truck P.

Referring to FIGS. 1–6, as briefly mentioned above, the tailgate toolbox assembly 10 also includes the rigid cover 14 for overlying and protecting the toolbox 12. Preferably, although not necessarily, the rigid cover 14 is a tread plate. Alternatively, the cover 14 can be a relatively smooth plate. The tread plate cover 14 extends the length and width of and is attached to the tool storage compartment 18 of the toolbox 12 and is shaped to overlie in a substantially flush relationship therewith the exterior of the tool storage compartment so as to protect the toolbox and to permit mobile equipment to be loaded and unloaded thereover onto pickup bed B without contacting the tool storage compartment when the toolbox 12 is in the closed position shown in FIGS. 2 and 4. The tread plate cover 14 includes a rigid rectangular base plate 28 substantially flat throughout its extent and being arcuate shaped at its opposite front and rear longitudinal edge portions. The tread plate cover 14 also includes a pair of flat opposite end plates 30 rigidly attached and enclosing the opposite ends of the base plate 28. The base and end plates 28, 30 together have a concave shape and define a rigid structure adapted to support mobile equipment being loaded and unloaded thereover onto and from the pickup bed B.

Figure 6:
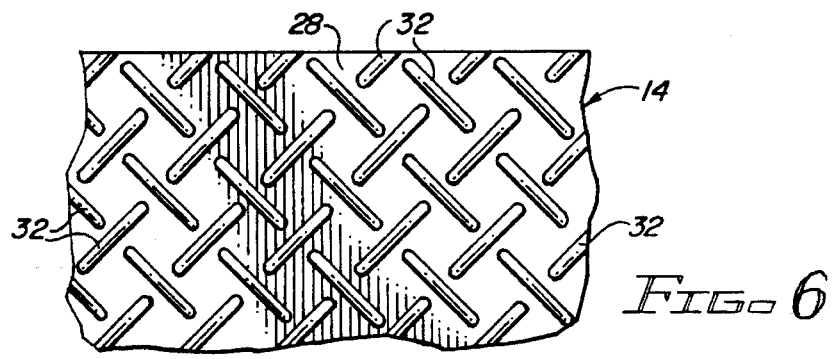
FIG. 6 is a close-up fragmentary view of the rigid tread plate cover of the tailgate toolbox assembly.

As best seen in FIG. 6, at least the base plate 28 of the tread plate cover 14 has a pattern of tread segments 32 formed thereon to provide a gripping surface for the tires of the mobile equipment to facilitate movement over the tread plate cover 14. The base and end plates 28, 30 of the tread plate cover 14 are preferably made of a heavy duty metal material such as steel or aluminum durable enough to permit the loading and unloading of mobile equipment thereover onto and from the pickup bed B without denting or otherwise damaging the cover 14 or toolbox 12.

The tailgate toolbox assembly 10 can be moved downward into a horizontal position as shown in FIGS. 2 and 4 wherein the toolbox 12 is in a closed position to permit full access to bed B. With the toolbox 12 and tread plate cover 14 mounted to tailgate G and the tailgate G pivotally moved down to the position of FIGS. 1–4, the flat sheet 16 of the toolbox 12 is in a substantially horizontal position and then the tool storage compartment 18 can be pivoted upwardly, such as through an arc of 90 degrees, to reveal the tools T stored therein as shown in FIGS. 1 and 3. The flat sheet 14 now in the horizontal open usage position, as shown in FIGS. 1, provides a workbench with the tools T being readily accessible thereabove.

Referring now to FIG. 5, the assembly 10 is shown in a vertical closed position in which the toolbox 12 takes up a minimal amount of space and thus does not reduce to any significant extent with amount of cargo space in the bed B nor interfere with any of the variety of uses of bed. A suitable releasable locking device 34 having matable locking members 34A, 34B are provided respectively on the flat sheet 16 and the tread plate cover 14 of the assembly 10 for use in opening and closing the toolbox 12.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A toolbox storage assembly for a pickup tailgate, comprising:

(a) a toolbox mountable on an inner side of a pickup tailgate having a length and a width, said toolbox including
  (i) an attachment member mountable on an inner side of the pickup tailgate in a flush relationship therewith and having a length and a width and adapted to extend substantially the length and width of the tailgate so as to substantially overlie and cover the inner side of the tailgate, and
  (ii) a tool storage compartment having an exterior and a length and a width and extending substantially said length and width of said attachment member, said attachment member and said tool storage compartment being pivotally hinged to one another along adjacent inner longitudinal edges thereof so as to mount said tool storage compartment to undergo pivotal movement between closed and open usage positions toward and away from said attachment member; and
(b) a rigid cover overlying and protecting said tool storage compartment of said toolbox and having a length and a width and being shaped to extend substantially said length and width of said tool storage compartment and to overlie in a substantially flush relationship therewith said exterior of said tool storage compartment so as to protect said toolbox and to permit mobile equipment to be loaded and unloaded thereover onto a pickup bed without contacting said tool storage compartment.

2. The assembly of claim 1 wherein said attachment member is a flat sheet which in said open usage position is substantially horizontal and provides a workbench.

3. The assembly of claim 2 wherein said toolbox when attached to the tailgate and disposed in a closed position can be folded down with the tailgate until said attachment member is substantially horizontal and then said tool storage compartment may be pivoted upward until substantially vertical to reveal tools stored therein.

4. The assembly of claim 2 wherein said rigid cover extends in a substantially flush relationship with said tool storage compartment and is spaced from said attachment member of said toolbox.

5. The assembly of claim 4 wherein said tool storage compartment is disposed on an interior side of and attached to said cover.

6. The assembly of claim 1 wherein said toolbox also includes at least one support connected to and extending between said tool storage compartment and said attachment member.

7. The assembly of claim 6 wherein said support is at least one actuator movable between extended and retracted conditions for controlling movement of said tool storage compartment and said attachment member relative to one another between closed and open usage positions.

8. The assembly of claim 7 wherein said support is a pair of said actuators disposed adjacent to respective opposite lateral ends of the attachment member and tool storage compartment.

9. The assembly of claim 7 wherein said actuator is biased to said extended condition so as to thereby maintain said assembly in said open usage position.

10. The assembly of claim 1 wherein said attachment member is a flat sheet which in said horizontal open usage position provides a workbench with said tools stored in said tool storage compartment being readily accessible above said flat sheet.

11. The assembly of claim 1 wherein said tool storage compartment of said toolbox has a plurality of tool receiving and restraining structures to store tools and to prevent the tools stored therein from dislodging therefrom.

12. The assembly of claim 1 wherein said rigid cover is a tread plate extending substantially the length of said tool storage compartment of said toolbox and having a pattern of tread segments formed thereon providing a gripping surface for tires of said mobile equipment.

13. The assembly of claim 1 wherein said rigid cover includes a rigid base plate extending said length and width of said tool storage compartment of said toolbox and a pair of opposite end plates attached to opposite ends of said base plate, said base and end plates together being of concave shape in cross-section to define a rigid structure that can support mobile equipment loaded and unloaded thereover onto and from a bed of a pickup truck.

14. The assembly of claim 13 wherein said rigid cover also includes a pattern of tread segments formed on said base plate to provide a gripping surface for wheels of the mobile equipment.

15. A pickup tailgate toobox storage assembly, comprising:
(a) an elongated movably mounted pickup tailgate having a length and a width;
(b) an elongated toolbox mounted in a flush relationship on an inner side of said pickup tailgate and being moved with movement of said pickup tailgate, said toolbox including
  (i) an attachment member mounted on an inner side of the pickup tailgate in a flush relationship therewith and having a length and a width and extending substantially said length and width of said tailgate so as to substantially overlie and cover said inner side of said tailgate, and
  (ii) a tool storage compartment having an exterior and a length and a width and extending substantially said length and width of said attachment member, said attachment member and said tool storage compartment being pivotally hinged to one another along adjacent inner longitudinal edges thereof so as to mount said tool storage compartment to undergo pivotal movement between closed and open usage positions toward and away from said attachment member; and
(c) a rigid cover overlying and protecting said tool storage compartment of said toolbox and having a length and a width and being shaped to extend substantially said length and width of said tool storage compartment and to overlie in a substantially flush relationship therewith said exterior of said tool storage compartment so as to protect said toolbox and to permit mobile equipment to be loaded and unloaded thereover onto a pickup bed without contacting said tool storage compartment.

16. The assembly of claim 15 wherein said toolbox includes a plurality of tool receiving and restraining structures attached to said tool storage compartment and adapted to store tools and to prevent the tools from dislodging therefrom during normal use of the pickup truck.

17. The assembly of claim 15 wherein said toolbox also includes a pair of actuators connected to and extending between said tool storage compartment and said attachment member at opposite ends of said actuators and being movable between extended and retracted conditions for controlling movement of said tool storage compartment and said attachment member relative to one another between said open usage and closed positions.

18. The assembly of claim 15 wherein said toolbox being attached to said pickup tailgate and disposed in a closed position is movable down with the tailgate until said attachment member is substantially horizontal and said tool storage compartment is pivotable upward until substantially vertical to reveal tools stored therein, said attachment member being a sheet which in said horizontal open usage position provides a workbench with said tools stored in said tool storage compartment being readily accessible thereabove.

19. The assembly of claim 15 wherein said rigid cover includes a rigid base plate extending said length and width of said tool storage compartment of said toolbox and a pair of opposite end plates attached to opposite ends of said base plate, said base and end plates together being of concave shape in cross-section to define a rigid structure that can support mobile equipment loaded and unloaded thereover onto and from a bed of a pickup truck.

20. The assembly of claim 19 wherein said rigid cover also includes a pattern of tread segments formed on said base plate to provide a gripping surface for wheels of the mobile equipment.

* * * * *